(12) United States Patent
Cremades Del Toro

(10) Patent No.: US 6,186,057 B1
(45) Date of Patent: Feb. 13, 2001

(54) AUTOMATIC CITRUS JUICE SQUEEZER

(75) Inventor: Francisco Cremades Del Toro, Moncada (ES)

(73) Assignee: Maquinas y Elementos, S.A., Moncada (ES)

( * ) Notice: Under 35 U.S.C. 154(b), the term of this patent shall be extended for 0 days.

(21) Appl. No.: 09/573,927

(22) Filed: May 18, 2000

(30) Foreign Application Priority Data

May 18, 1999 (ES) ................................................. 9901055

(51) Int. Cl.[7] ............................. A23N 1/00; A47J 19/00; A47J 19/02; A47J 43/14
(52) U.S. Cl. .......................... 99/503; 99/501; 99/504; 99/505; 99/507; 99/508; 100/98 R; 100/213
(58) Field of Search .......................... 99/495, 501–508, 99/348; 100/97, 98 R, 213, 234, 288, 103, 131, 902; 210/307, 335, 470, 514

(56) References Cited

U.S. PATENT DOCUMENTS

| | | | |
|---|---|---|---|
| 1,115,754 | * | 11/1914 | Walker .................................. 99/507 |
| 2,018,932 | * | 10/1935 | Thorne .............................. 99/508 X |
| 2,042,341 | * | 5/1936 | Ilgenfritz ........................... 99/506 X |
| 2,099,170 | * | 11/1937 | Majewski, Jr. ..................... 99/495 X |
| 2,160,523 | * | 5/1939 | Scurlock ................................. 99/507 |
| 2,238,571 | * | 4/1941 | Scott .................................. 99/508 X |
| 2,497,335 | * | 2/1950 | Wissner .............................. 99/495 X |
| 2,674,182 | * | 4/1954 | Kirkpatrick ........................ 100/98 R |
| 2,786,502 | * | 3/1957 | Turner ............................... 100/288 X |
| 4,530,277 | * | 7/1985 | Matsumoto ....................... 100/131 X |
| 5,084,177 | * | 1/1992 | Keene .................................. 210/514 |
| 5,510,028 | * | 4/1996 | Kuhlman ............................. 210/307 |
| 5,520,105 | * | 5/1996 | Healy ................................. 100/98 R |

* cited by examiner

Primary Examiner—Timothy F. Simone
(74) Attorney, Agent, or Firm—Michael J. Striker (57) ABSTRACT

The improvements to the automatic citrus juice squeezer consist of: a movement of the pressure cup (3) by means of a drive screw (5) and a guide column (6); the cup being removably-mounted and detachable from its holder (7) by raising a trip fastener (12) using a catch (13); it has five angularly equidistant blades (2); a squeezer-filter (16) and support assembly (1) can descend against the action of an axial spring (14), maintaining the dynamic connection with the drive shaft by means of gears (18) that may slide along an intermediate sprocket (19); the juice collector (17) empties into a dish (20) which opens/closes a tilting plug (21) as it is introduced/extracted: the blades (2) are connected to the fixed shaft (15) by elastic legs (23) with internal strengtheners (24) which fit into a peripheral neck (25) of the said shaft; and the cup's (3) profile has an enlarged lower curvature to prevent its separation from the squeezer support (1) from narrowing.

9 Claims, 8 Drawing Sheets

AUTOMATIC CITRUS JUICE SQUEEZER

DESCRIPTION

1. Object of the Description

The present invention refers to a machine for automatically squeezing citrus fruits, which has improved features with respect to those known and used for this same purpose in the present state of the art.

2. Background of the Invention

In the market, citrus juice squeezers are known, which are generally made up of a set of structural components among which are the following:

a squeezer support, provided with helicoidal grooves, which may be moved in opposing alternating gyratory movements corresponding to the fruit-squeezing and rind-expulsion operations;

vertical blades situated upon the squeezer support, although separated from the latter, usually arranged in two orthogonal planes, which are trapeziform so that they may form in their upper part a housing to accommodate the fruit during the juice-extraction process;

a pressure cup, whose inner shape fits into the outer shape of the said squeezer support, which may make alternate vertical movements (downwards and upwards), driven by two threaded shafts which gyrate synchronously to maintain the position of the central shaft in symmetry with the cup during the latter's vertical movement, and in which there are slots in positions which correspond with the said blades, for the insertion of the latter in the former during the descending movement of the cup, so that the fruit is pressed against the said blades, which cut it into segments, pressing the latter against the grooves of the squeezer support.

The conventional type of machine mentioned above, has practical drawbacks manifested in certain structural and/or operating deficiencies, which the improvements incorporated in the citrus juice squeezer of the present invention are intended to resolve.

SUMMARY OF THE INVENTION

Therefore, as stated above, the object of the present invention consists of the provision of a citrus juice squeezer of automatic operation, provided with greatly improved features which allow the drawbacks observed in conventional automatic machines to be remedied.

Thus, the first improvement provided by the invention consists of improving and simplifying the operational conditions of the pressure cup of known juice squeezers, to which end one of the two threaded shafts which drive the alternate upwards and downwards movements of the pressure cup, has been replaced by a guide cylinder, along which the part holding the pressure cup slides when it is made to move vertically by the gyration of the screw in which it is threaded. In this way the transmission required by the presence of two endless shafts, intended to make their gyrations synchronous, is eliminated. Consequently, in the juice squeezer of the invention, the vertical movement of the pressure cup (upwards and downwards) is produced by means of a drive screw and guide column mechanism which drives the vertical movement of the part holding the said cup, parallel to itself, for which purpose it is provided with two orifices, namely, a threaded one for the drive screw to engage with, and a smooth one for the guide column to pass through.

Another improvement of the present invention affects the pressure cup, in such a way that, while in known juice squeezers the said pressure cup is fixed with its holding elements, without the possibility of disassembling it for ease of cleaning, in the machine of the invention this cup may be separated from its holding part, as its connection to the same is effected by means of a grooved area which rests upon an axis of the said part, remaining fastened with respect to its gyratory movement by means of a trip element which may optionally be unfixed by means of a pressure catch.

Another improvement incorporated in the machine of the present invention consists of having a predetermined number of blades on the squeezer support which, in the preferred embodiment, are to be five in number, angularly equidistant with a separation of 72°, in comparison to the four blades incorporated by conventional machines and every two consecutive blades separated by an angle of 90°. The arrangement in accordance with the invention allows an appreciable improvement in the feeding of fruit to the receptacle formed by the blades in their upper part, as they gain access to the same through the aperture of separation between every two consecutive blades; in effect, while in the case of conventional machines, the angular separation being 90°, the fruits encounter another equal separation in front of the entrance, through which they may leave without being squeezed, in the case of the proposed angular separation of 72° the fruits encounter in front of their entrance the upper part of the blade which is situated as a prolongation of the ideal bisecting plane of the dihedron through which they pass, which acts as an end stop, preventing the fruit from coming out. This improvement is especially useful when squeezing fruit of small diameter, which, as one knows, are precisely those which are most commonly intended for juice extraction.

Another additional improvement incorporated in the juice squeezer of the present invention is intended to improve the juice extraction process, so that the process will be gradual and prevent the segments cut by the blades from undergoing abrupt compression which would deform their rinds and give rise to the expulsion of essential oils and thus a loss of juice quality. To this end, a helicoidal spring arrangement has been provided on the fixed gyrating shaft of the squeezer-filter support unit, which allows the gradual descent of the same as the spring yields to the pressure of the cup upon the fruit and of the latter upon the squeezer support. At the same time, so as not to lose the dynamic connection with the drive shaft during the movement of the unit, this connection is maintained by means of a gearing situated in the lower part of the juice collector, which pulls the squeezer-filter support unit with it as it gyrates, while it slides along an intermediate sprocket between the said gearing and the drive shaft, while the transmission remains active.

Another improvement incorporated in the machine of the invention relates to the storage and supply system of the extracted juice. The said juice is collected initially in the collector, after passing through the slightly concave filter situated in the base of the squeezer support and joined to the latter, and the said collector may optionally be emptied into a juice dish which, on being introduced into its housing under the collector, opens a tilting plug situated in the base of the same and closes it when extracted.

Yet another improvement affects the blade retention system, in such a way that these remain fixed in their working position while the cup ascends after having pressed, cut and squeezed the fruit, and these blades may, however, be withdrawn optionally for cleaning when the squeezer support and the cup are in their raised rest positions. To this end, the central conico-cylindrical nucleus which is grouped radially around the blades, ends below in elastic legs which prolong the side surface of the cylindrical area of the said nucleus and possess at their free ends inner strengthenings which fit under pressure into a peripheral neck with which, for this purpose, the fixed shaft is provided, around which the extractor support gyrates, close to its upper end, which penetrates tightly into the lower cylindrical part of the nucleus. During the support's ascent and reverse gyration, while the rind is expelled, the support itself prevents the legs from disengaging as it holds them by virtue of the passing cylindrical penetration of the gyratory shaft, retaining the blades in their working position, without their being pulled along by the support's ascending movement.

Finally, another improvement incorporated in the machine of the invention affects the inner arrangement of the pressure cup which, in known juice squeezers, fits into the outside of the squeezer support, coinciding with the latter with strictly sufficient play to contain the rind of the squeezed fruit between both parts. However, as a consequence of the homothetic design of the said surfaces (inside of the cup and outside of the support) and of the vertical movement of the cup parallel to the former, following the common axis of longitudinal symmetry, when the cup is superposed upon the squeezer support a narrowing is produced in the separation between the two parts which gives rise to a compression of the fruit's rind, with the resulting extraction of essential oils from the said rind which reduce the quality of the squeezed juice. The improvement of the present invention provides for the design of a new inner shape for the cup, with a greater radius of curvature in its lower area, so that a diminution in the separation of the cup and the squeezer support is not produced in any relative position of the former upon the latter.

BRIEF DESCRIPTION OF THE DRAWINGS

These and other features and advantages of the invention will be more clearly understood from the detailed description which follows of an example of an embodiment of the same, given solely by way of illustrative and non-restrictive example, with reference to the accompanying drawings, in which.

DESCRIPTION OF THE PREFERRED EMBODIMENT OF THE INVENTION

To show clearly the nature and scope of the features of the improved automatic juice squeezer of the invention and the advantages of its application, the structure and operation of the said juice squeezer are described below, making reference to the drawings which, as they represent only an example of a preferred embodiment, are to be understood merely as illustrative, and should therefore be considered in their broadest sense and in no case as restricting the content and application of the invention.

The automatic citrus juice squeezer which is the object of the invention is of the type which includes, as structural elements, a squeezer support (1) which may gyrate alternately in opposite directions; blades (2) in a vertical position, of an advantageous trapeziform shape, situated above the squeezer support (1), and independent from the latter; a pressure cup (3), capable of making alternate vertical movements, provided with slots (4) for the insertion of the blades (2) when it descends.

Figure 1:
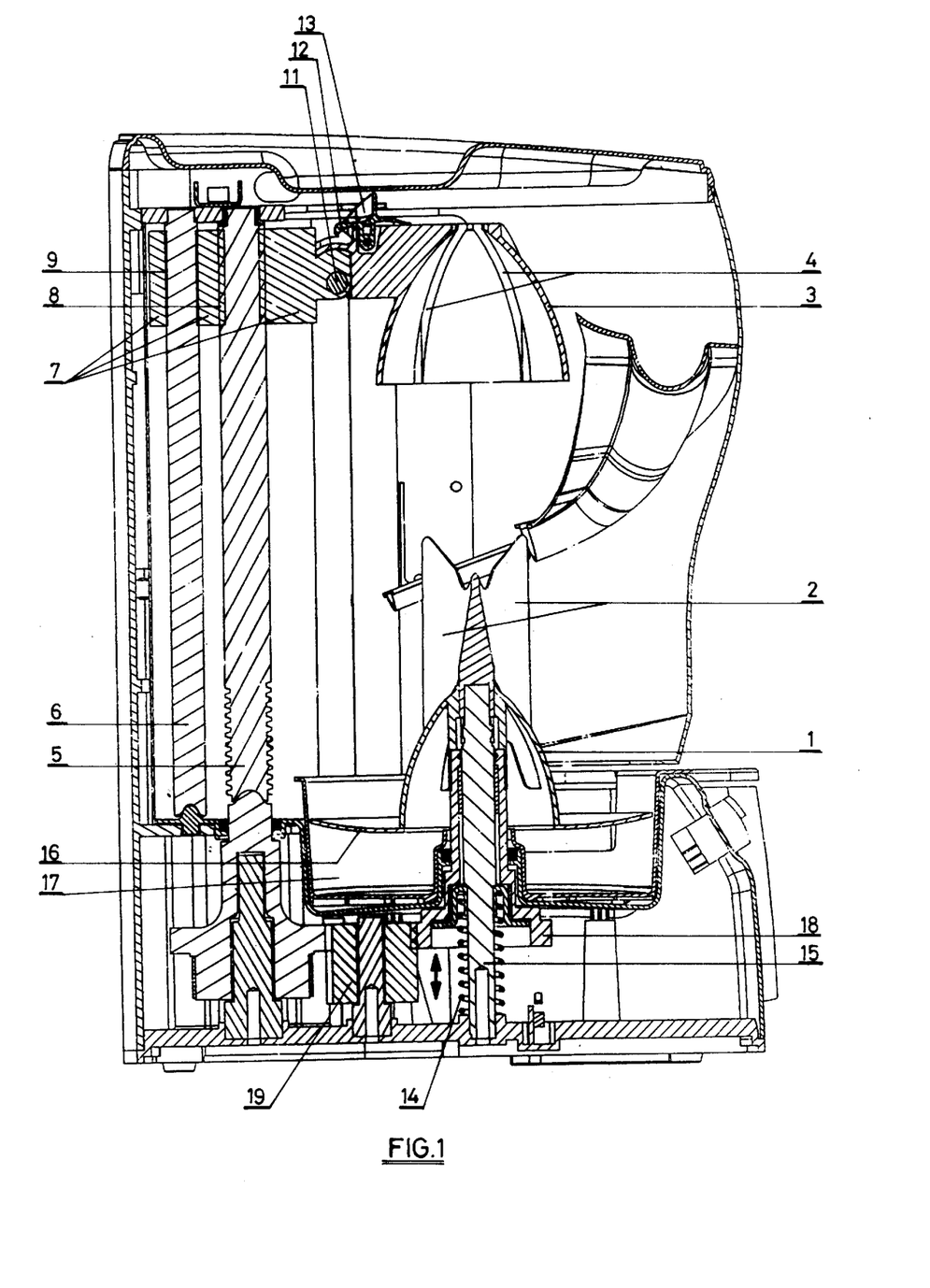
FIG. 1 shows an overview, in longitudinal section, of the squeezer of the invention in its assembled state, ready for use.

By virtue of this arrangement, the improvements provided with respect to known juice squeezers of the type described above, are as follows:

The vertical movement of the pressure cup (3) is produced by means of a drive screw (5) and guide column (6) mechanism which drives the movement of the part (7) holding the cup (3), parallel to itself, for which purpose it is provided with two orifices, a threaded one (8) into which the screw (5) threads, and a smooth one (9), through which the column (6) passes tightly, as may clearly be observed in FIG. 1.

Figure 2:
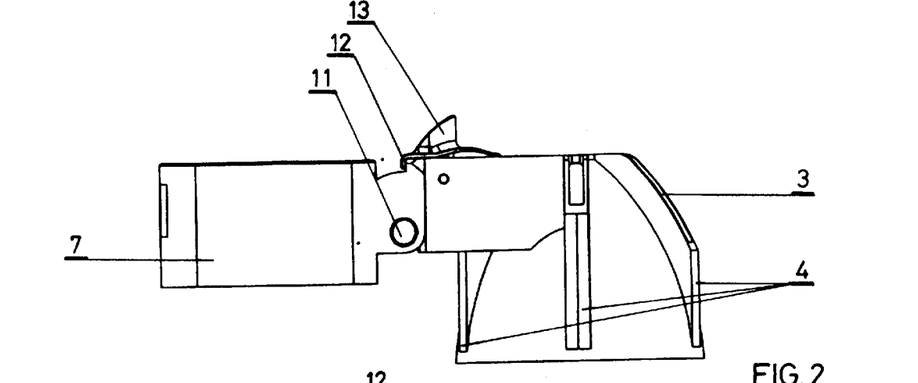
FIGS. 2, 3 and 4 show a side elevation and, in different phases, the process of extraction of the pressure cup with, respectively, the said cup in working position, with the trip unfastened, and with the cup already withdrawn, after separating the grooved area from its supporting axis.
Figure 3:
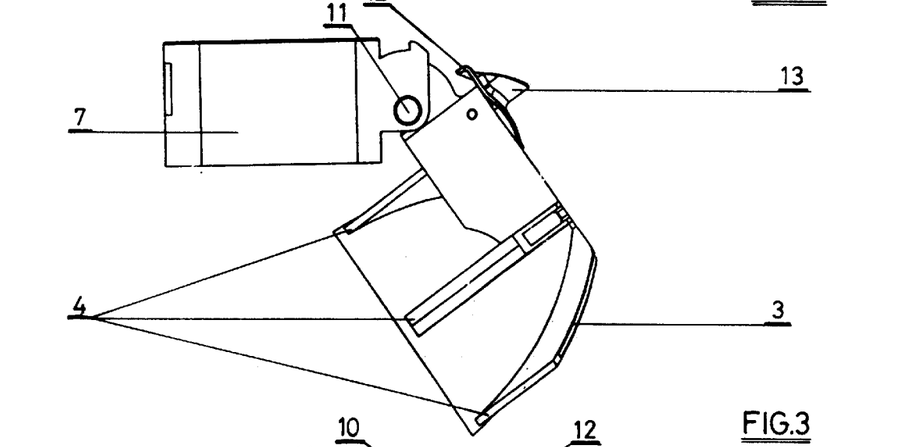
Figure 4:
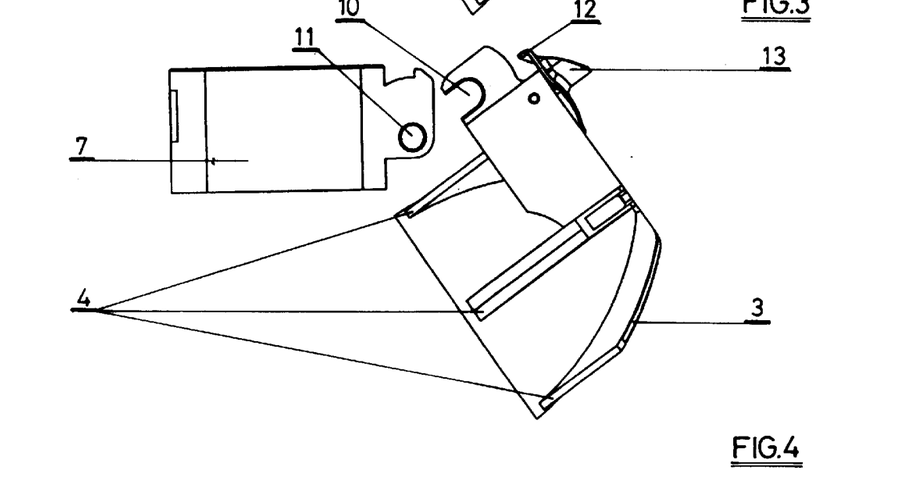
Figure 5:
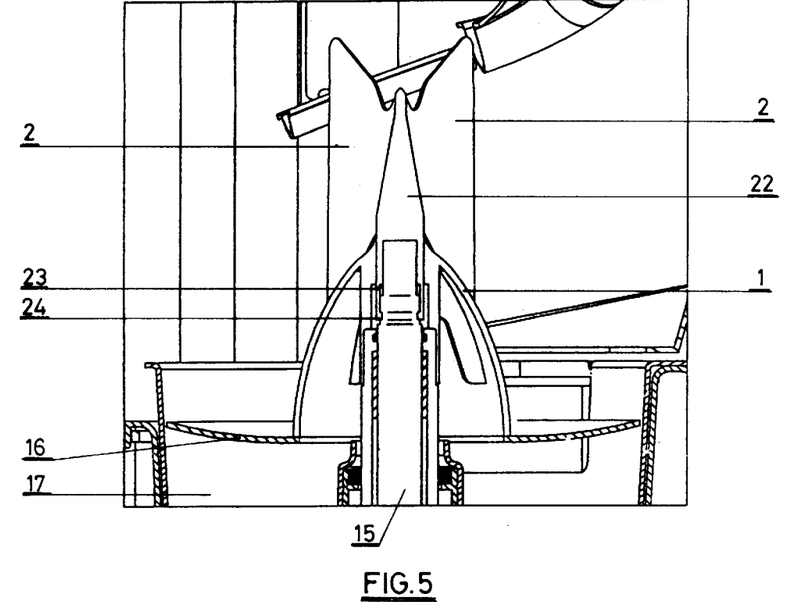
FIGS. 5 to 8 show, in longitudinal section, different relative positions of the blades and of the extractor support, corresponding respectively to the initial working position; starting position for manual extraction of the blades, with the end protuberances of the legs of its nucleus partially outside and above the neck of the shaft into which they fit; a more advanced phase of blade extraction, and blades fitted into the working position, retained by means of the squeezer support collar, while the said support has descended in a similar way to when it supports the pressure of the cup and the fruit.
Figure 6:
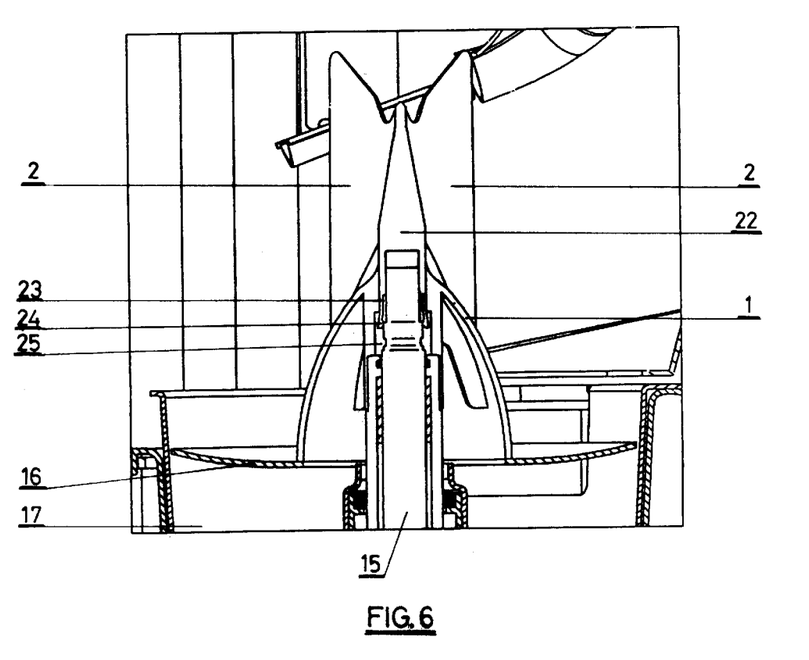
Figure 7:
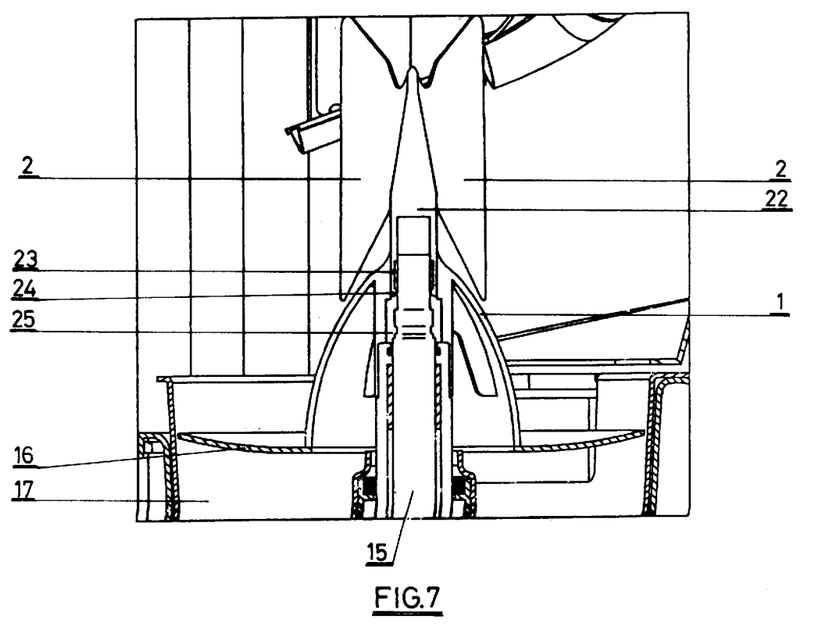
Figure 8:
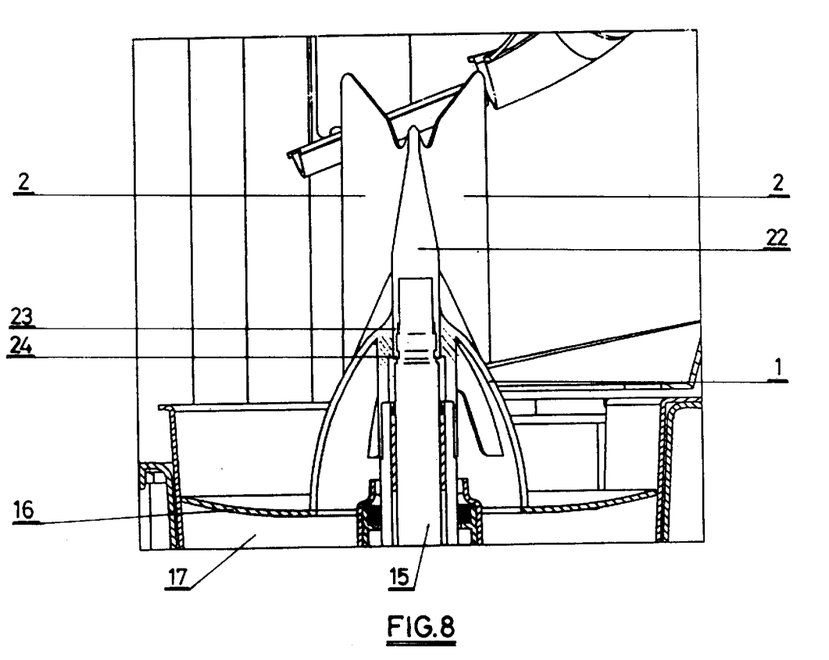
Figure 9:
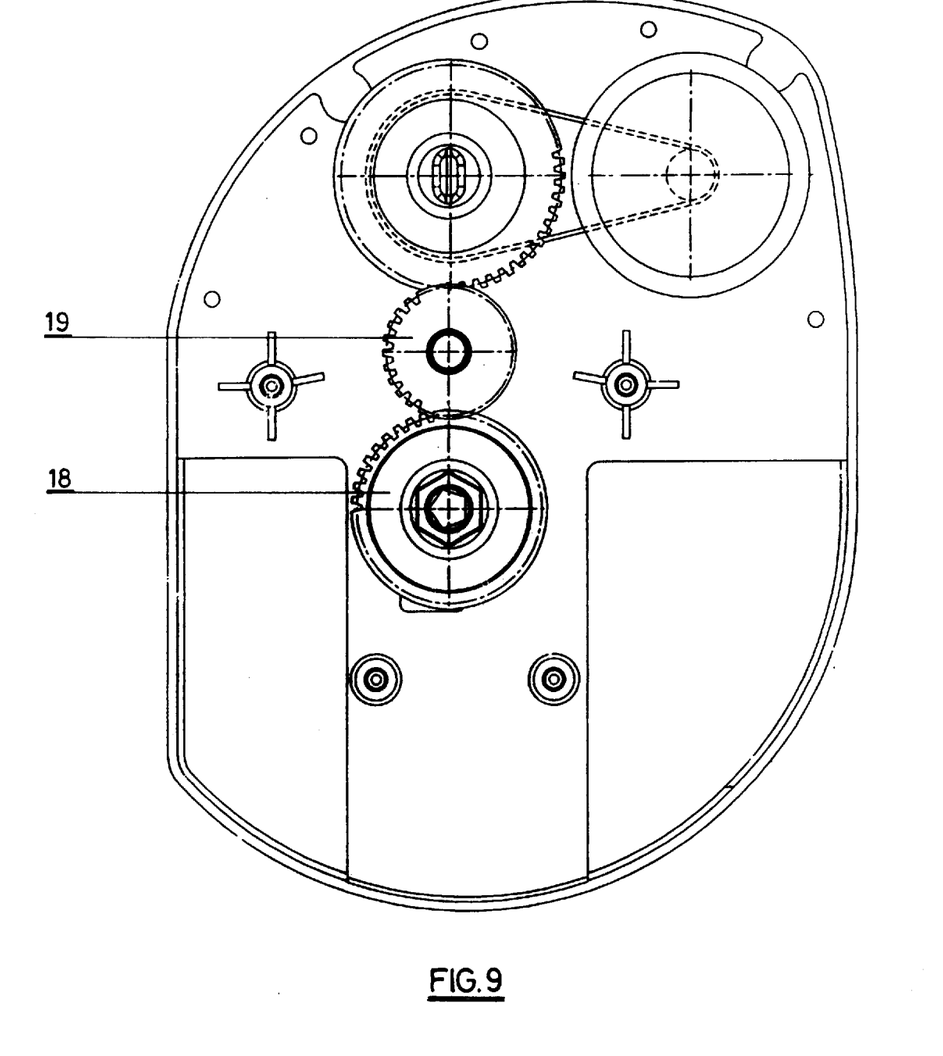
FIG. 9 shows a transverse section of the improved juice squeezer of the invention, showing the relative arrangement of the components for transmitting the gyratory movement.
Figure 10:
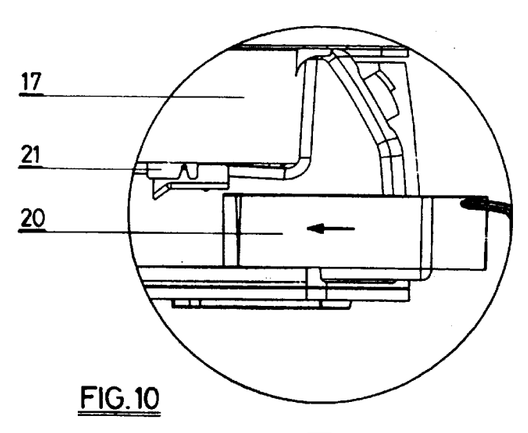
FIGS. 10 to 13 show different positions of the juice dish corresponding, respectively, to the conditions of initial introduction of the dish into its housing; opening of the tilting plug for emptying the juice collector by virtue of the progressive introduction of the said dish; the dish in its final position, with the resulting emptying of the juice collector, and the dish extraction phase with the juice inside, with the resulting operation of closing the tilting plug to prevent possible dripping.
Figure 11:
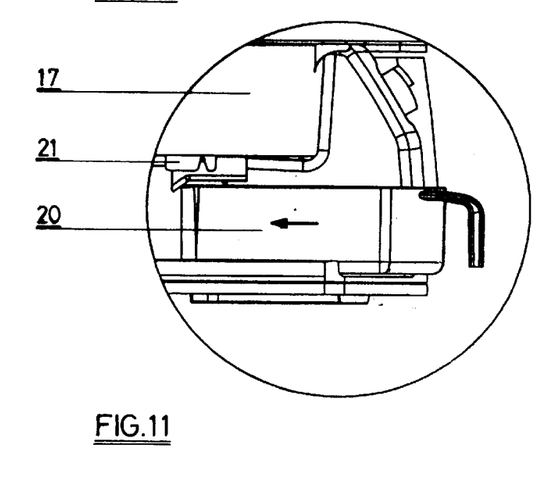
Figure 12:
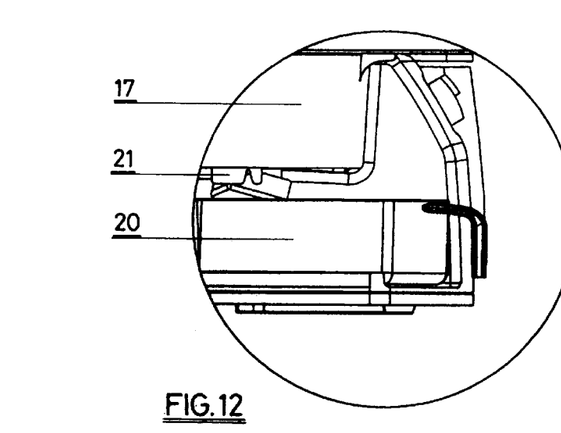
Figure 13:
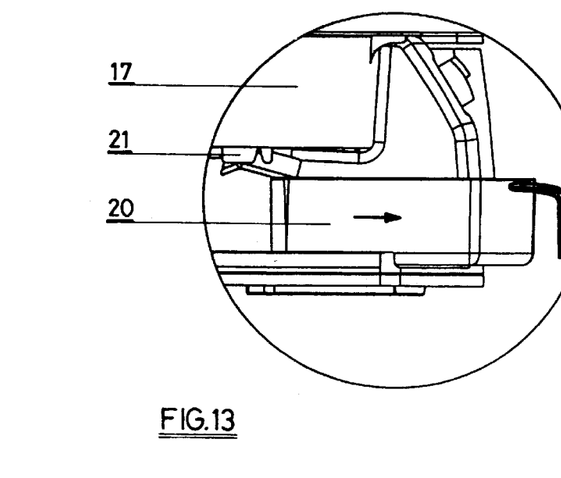

The pressure cup (3) is held removably-mounted but is detachable, and is connected to its holding part (7) by means of a grooved area (10) which rests upon an axis (11) of the said part (7), remaining fixed in respect of its gyratory movement by means of a trip (12) which may optionally be unfastened by means of a pressure catch (13) (see FIGS. 2, 3 and 4).

Figure 14:
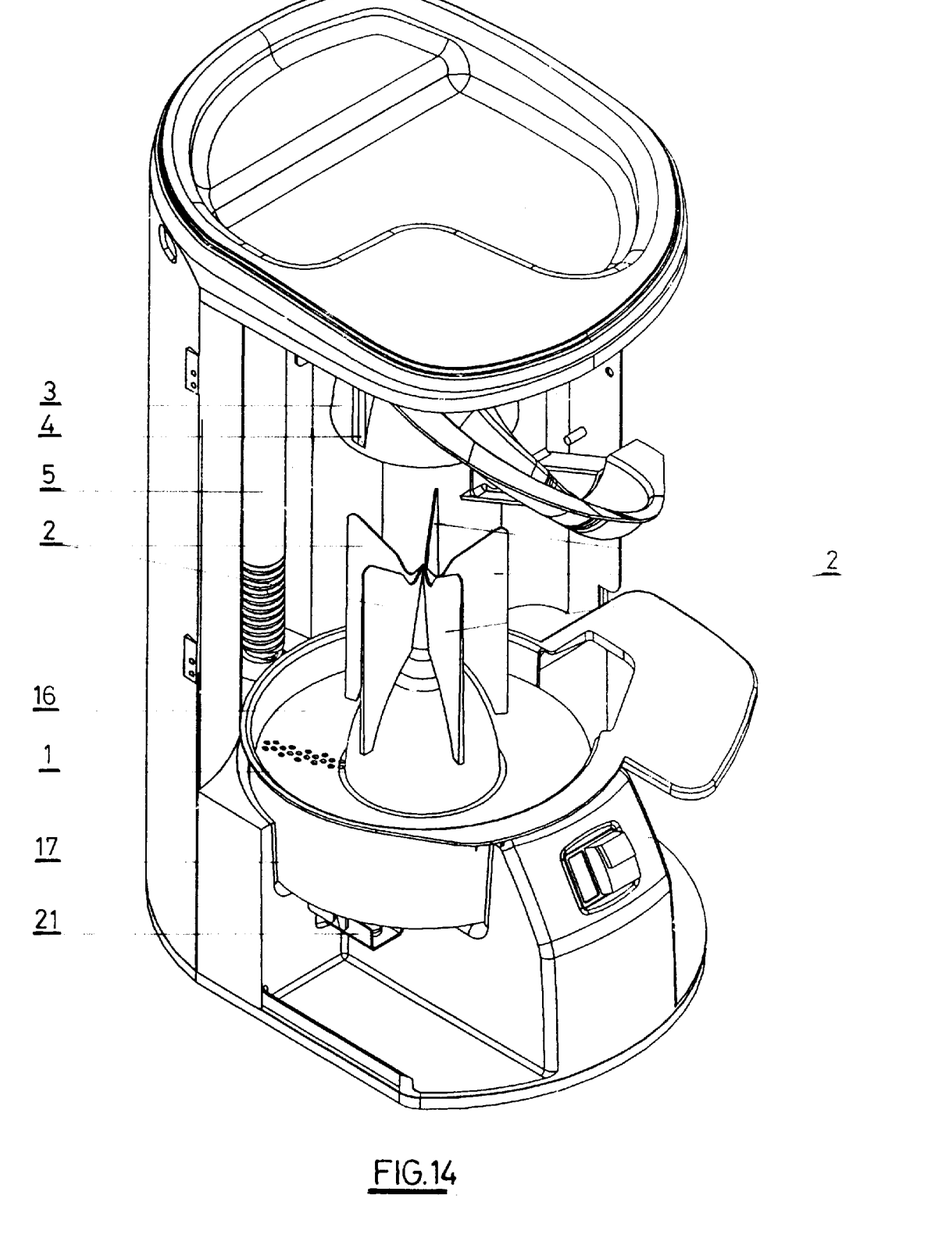
FIG. 14 is a perspective view of the juice squeezer of the invention in operating position, but without the juice dish for reasons of representational clarity.

The improved juice squeezer of the invention has, preferably, five vertical blades (2), situated above the squeezer support (1), with equal angular separations as shown more clearly in FIG. 14 of the drawings.

Also, a helicoidal spring (14) has been provided, arranged on the fixed gyrating shaft (15) of the unit made up of the squeezer support (1) and the filter (16), which allows this unit to descend gradually as the spring (14) is compressed under the pressure exerted by the cup (3) upon the fruit and upon the said squeezer support (1) (see FIG. 1).

So as not to lose the dynamic connection of the unit with the drive shaft during its vertical movement, this connection is maintained by means of gearing (18) situated in the lower part of the juice collector (17), which pulls the squeezer-filter support unit with it as it gyrates, while it slides along an intermediate sprocket (19) between the said gearing (18) and the drive shaft, without the geared gyration of the transmission components stopping (see FIG. 1).

The extracted juice is collected in the collector (17) after passing through the slightly concave filter (16) situated in the base of the squeezer support (1) and joined to the latter, and the collector (17) may optionally be emptied into a juice dish which, on being introduced empty into the housing provided for this purpose under the collector (17), operates a tilting plug (12) situated in the base of the housing, opening it with the movement of introduction and closing it with the movement of extraction of the dish full of juice (see FIGS. 10 to 13).

The central conico-cylindrical nucleus (22) which is grouped radially around the blades (2) ends below in elastic legs (23) which prolong the side surface of the cylindrical part of the said nucleus (22) and possess at their free ends inner strengthenings (24) which fit under pressure into a peripheral neck (25) with which, for this purpose, the fixed shaft (15) is provided, close to its upper end, which penetrates tightly into the lower cylindrical part of the nucleus (22), as may be observed in FIGS. 5 to 8.

Figure 15:
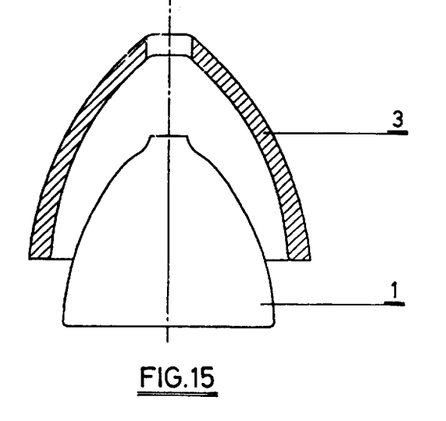
FIGS. 15, 16 and 17 show three successive positions relating to the process of superposition of the pressure cup upon the extractor support, from which it may be perfectly appreciated that, by virtue of the new design of the inner shape of the said cup, at no time during the process is there a diminution of the separation between both the said parts.
Figure 16:
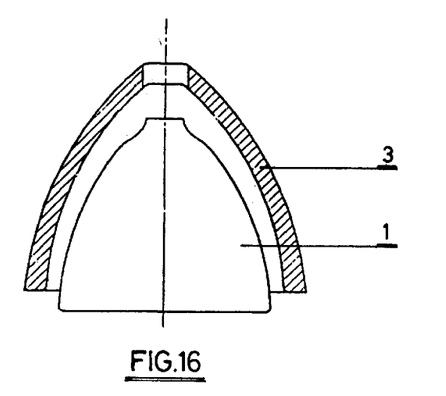
Figure 17:
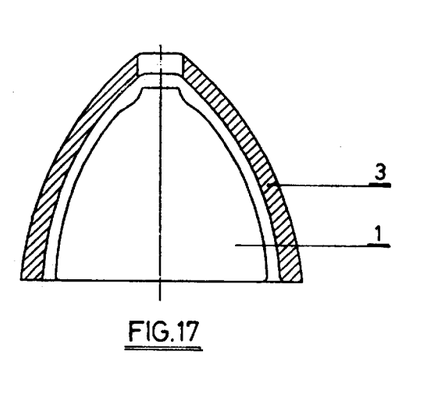

Finally, the inner shape of the pressure cup (3), has an enlarged curvature in its lower area, so that during the process of superposition of the said cup (3) upon the squeezer support (1) a diminution in their separation is not produced in any relative position of the former upon the latter (see FIGS. 15 to 17).

What is claimed is:

1. An automatic citrus juice squeezer, comprising a squeezer support gyratable alternatingly in opposite directions; a plurality of vertical blades, located above said squeezer support but independent from the latter; a pressure cup movable so as to perform alternate vertical movements, said pressure cup being provided with slots for insertion of said blades when said pressure cup descends; means for causing the vertical movements of said pressure cup, said means including a drive screw and guide column mechanism which provides a movement of a part holding said cup parallel to itself, said part being provided with two orifices including one orifice which is threaded for threading said drive screw into it, and another orifice which is smooth through which said column passes tightly.

2. An automatic citrus juice squeezer as defined in claim 1, wherein said vertical blades have a trapeziform shape.

3. An automatic citrus juice squeezer as defined in claim 1, wherein said pressure cup is mounted removably and is detachable from said part, said part having a grooved area for connecting with said pressure cup; and further comprising a trip which retains said pressure cup fixed in respect of its gyratory movement; and a pressure catch for unfastening of said trip.

4. An automatic citrus juice squeezer as defined in claim 3, wherein there are five such vertical blades which are located above said squeezer support at equal angular distances.

5. An automatic citrus juice squeezer as defined in claim 1; and further comprising a helicoidal spring attached to a fixed gyrating shaft of a unit composed of said squeezer support and a filter, so that said unit can descend gradually as said spring is compressed under a pressure exerted by said pressure cup upon a fruit and upon said squeezer support; and a gearing maintaining a dynamic connection of said unit with said drive shaft during a vertical movement of said unit, said gearing being located in a lower part of a juice collector which pulls said unit with it as it gyrates; and an intermediate sprocket on which it slides along between said unit and said drive shaft without a geared gyration of transmission components.

6. An automatic citrus juice squeezer as defined in claim 5, wherein said filter is substantially concave and located at a base of said squeezer support and joined to the later, so that an extracted juice is collected in said collector after passing through said filter.

7. An automatic citrus juice squeezer as defined in claim 6, and further comprising a juice serving dish in which said collector can be emptied, said serving dish being introducible under said collector so as to cause a tilting plug located in a base of said collector to open, and causes it to close by an opposite movement during extraction of said serving dish.

8. An automatic citrus juice squeezer as defined in claim 5, wherein said fixed shaft is provided with a peripheral neck; and further comprising a central conical-cylindrical nucleus which is grouped radially around said blades, ends below in elastic legs which prolong a side surface of a cylindrical part of said nucleus, and possess at their free ends inner strengthening which fit under pressure into said peripheral neck of said fixed shaft close to its upper end, which penetrates tightly into a lower cylindrical part of said nucleas.

9. An automatic citrus juice squeezer as defined in claim 1, wherein said pressure cup has an inner shape with a lower area having an enlarged curvature so that during a process of superposition of said pressure cup upon said squeezer support, a diminution of their separation is produced in any relative position of said pressure cup and said squeezer support.

* * * * *